Nov. 12, 1963     L. B. EZRA     3,110,116
EDUCATIVE DEVICE

Filed Feb. 16, 1961     2 Sheets-Sheet 1

INVENTOR
LEON BEN EZRA

BY *Fidelman & Lavine*
ATTORNEYS

Nov. 12, 1963  L. B. EZRA  3,110,116
EDUCATIVE DEVICE
Filed Feb. 16, 1961  2 Sheets-Sheet 2

INVENTOR
LEON BEN EZRA
BY *Fidelman & Lavine*
ATTORNEYS

United States Patent Office 3,110,116
Patented Nov. 12, 1963

3,110,116
EDUCATIVE DEVICE
Leon Ben Ezra, 1340 Nicholson St. NW.,
Washington, D.C.
Filed Feb. 16, 1961, Ser. No. 89,825
8 Claims. (Cl. 35—35)

The present invention relates to an educative device, and more particularly to such a device for fully and systematically teaching a basic component of the English language, the three letter monosyllable with initial and final consonants and an intermediate vowel.

In analyzing the structure of the English language, it has become apparent to linguists that monosyllabism is one of the most characteristic features of English as it is spoken and written today.

In the educative process, it is highly desirable that the person learning to read, whether he be a child who already speaks English, or a person whose native tongue is other than English, initially be given a basic foundation of monosyllabism in its simplest forms and most symmetrical phonic structure. These objectives may be approximated in roughly two broad stages. In the first and most simple stage, by employing selected letters of the alphabet, the beginning reader is introduced to the large and cognate group of English monosyllables, such as dab, pen, bid, fog and hum, which have as their core the short sounds of the vowels, a, e, i, o and u, shaped by a single consonant before and after the vowel. In the second stage, for more advanced work, other consonants are added to those already employed so that practically all the three letter monosyllabic words of the English language can be obtained, which have an initial and final consonant and an intermediate vowel.

It is further recognized that the 26 letters of the alphabet are essentially symbols of sound and that monosyllables, and in fact all words, are made up of phonemes, these being defined as "the smallest unit of speech that in any given language distinguishes one utterance from another, as the p in pin and the f in fin, by which these two English words are distinguished from each other."

Based on the above factors, it has also been realized that the basic three letter monosyllables of the English language can be changed, phoneme by phoneme, to arrive at other and phonically closely related monosyllabic words; for example, by starting with the monosyllable bat, and by changing the initial consonant phoneme, there is obtained cat, fat, hat, mat, pat, rat, sat, tat. And as may be seen, many other monosyllabic words may be obtained similarly by employing a basic positional format consisting of an initial consonant, a vowel, and a final consonant. Thus, each consonant and vowel may be thought of, and is, a phoneme, and through the aforementioned basic positional format, word changes may be obtained by simply varying one phoneme at a time. Accordingly, (a) by starting with bat and varying the initial consonant phoneme while holding constant the vowel and final consonant we obtain cat, fat, hat, mat, pat, rat, sat, tat; (b) similar word changes may be obtained by retaining the initial consonant and the vowel while the final consonant is changed, as in bad, bag, ban, and bat (c) similarly, by varying the vowel and retaining the initial and final consonants we get the words hat, hit, hot and hut.

Thus as illustrated in (a) above, by simply varying the initial consonant while retaining the vowel and final consonant we can produce 35 series of phonically related word changes average 7.5 words in each of these series. Further, as illustrated in (b) above, by varying the final consonant while retaining the initial consonant and vowel, we can produce 60 series of phonically related word changes averaging 4.37 words in each of these series. Moreover, as illustrated in (c) above, by varying the vowel while retaining the initial consonant and final consonant we can produce 98 series of phonically related word changes averaging 2.66 words in each of these series.

By this systemic device, permitting the varying of a single phoneme, while holding two other phonemes constant, the symmetrical phonic structure of the monosyllable is illustrated graphically to the beginning reader. In effect, the child receives an elementary course in inductive phonics. Moreover, through this device, the child is led to recognize word changes through his own differentiation and generalization.

There have been provided in the prior art various educational or teaching devices, and these devices have generally fallen into several categories. In a first category are devices providing a plurality of carrier elements (disc, wheel, tape, etc.), varying in number from three to twenty-six. Each carrier element has on it a large number of letters, usually the entire twenty-six in the alphabet. In a similar vein, some of the carrier elements have provided word components, such as common word ending groups, examples of which are "ed" and "ing." The carrier elements are each movable so that particular indicia could be brought into a desired array, to thereby present a group of letters (or word components) which may or may not spell an actual word.

The second category, rather than provide a large number of letters on each carrier element, provides only three carrier elements each of which had a relatively low number of letters, such as four. While with these devices the probability of spelling a word at each position of the carrier elements is large, as contrasted to the extremely low probability of the first category, it is clear that only a very low number of words can be spelled with devices of this second category.

The common failing of these prior devices, from the standpoint of being educative instruments, is that none of them truly recognized and have taken advantage of a key fact: that there is a central core of three letter monosyllabic words in the English language and that of this core or group, there is a high concentration of words which begin with certain consonants, only, and a high concentration of words which end in certain consonants, only. By utilizing this fact, and a natural amusement obtained from a chance device, the teaching of a large number of basic monosyllabic words may be readily accomplished.

An object of the present invention is to provide an educative device which will facilitate the learning of basic English monosyllabic words.

Another object of the present invention is the provision of an educative device for teaching basic English three letter monosyllabic words.

Yet another object of the present invention is to provide an educative device for teaching three letter monosyllabic words and comprising plural letter carrier elements separately movable and stopped by chance, which device will provide a high probability that an actual word will be presented.

Other objects and many of the attendant advantages of the present invention will be apparent from the following specification and drawings wherein.

Figure 1:
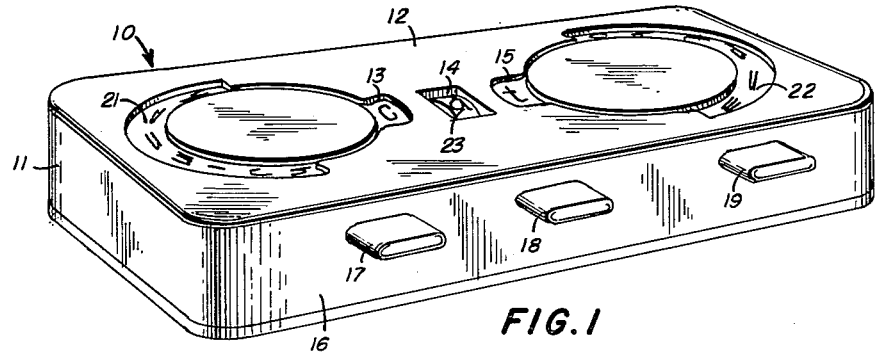
FIG. 1 is a perspective view of an educative device in accordance with the present invention.

Referring now to the drawings, wherein like reference characters are used to designate like or corresponding parts throughout the several views, there may be seen in FIG. 1 an educative device 10 comprising a box or container 11 having in the upper face 12 thereof three aligned openings 13, 14, and 15. Extending from the front 16 of the container 11 are three operating buttons 17, 18, and 19.

Figure 2:
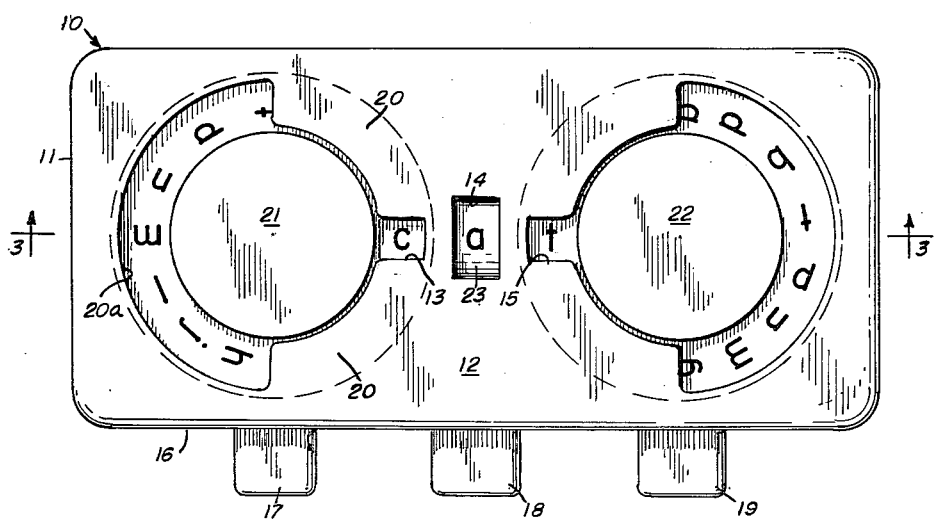
FIG. 2 is a plan view of the device of FIG. 1.

The relative position of the openings 13, 14, and 15 may best be seen from FIG. 2, and as will be apparent the openings are so positioned that letters visible through them will be in the usual formation for presenting a word. Opening 13 is formed by the spaced termini of two arcuate lobes 20, each of which extends through somewhat less than 90° to thereby provide a large access opening 20a opposite opening 13.

Figure 3:
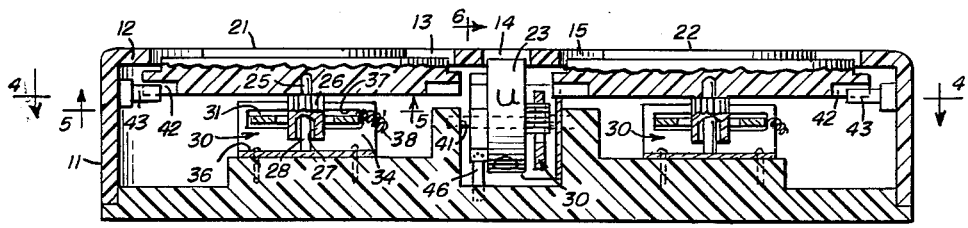
FIG. 3 is a cross sectional view taken on the line 3—3 of FIG. 2.

Certain selected letters are presented on carrier elements mounted within the container 11, there being, as shown in FIG. 3, a first horizontal disc 21, a second horizontal disc 22, and a cylinder 23. The discs 21 and 22 have letters on the upper surfaces thereof, as will be seen from FIGS. 1 and 2, and as the discs 21 and 22 are structurally alike, only disc 21 will be described. A spindle 25 (see FIG. 3) extends into the center of the disc 21, spindle 25 being integral with a gear 26 having a hollow 27 at the lower part thereof. A pointed pivot pin 28 extends into the hollow 27, and thereby rotatably supports gear 26, spindle 25, and disc 21. Disc 21 may be seen, therefore, to be rotatably supported generally parallel to and slightly below the face 12 of container 11. Further, a portion of the periphery of disc 21 may be seen in each of FIGS. 1, 2, and 3 to lie below the opening 13, and below the opening 20a. As before noted, disc 22 is similarly supported, and a part of the periphery thereof lies below the opening 15.

Figure 4:
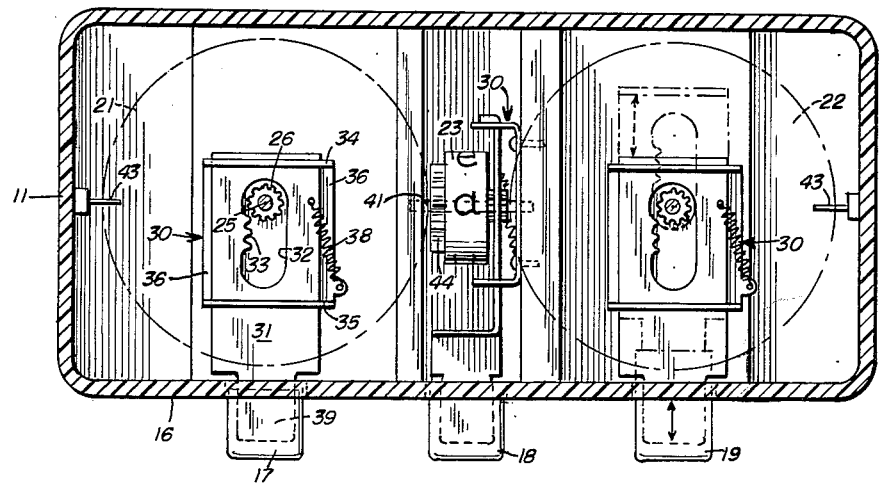
FIG. 4 is a cross sectional view taken on the line 4—4 of FIG. 3.

A spinning mechanism 30 is provided for each of the carrier elements, and in FIGS. 3 and 4 there may be seen the spinning mechanism 30 for the disc 21, comprising plate 31 having a slot 32 therein, one side of the slot 32 being provided with teeth 33. The plate 31 is carried in the upstanding end pieces 34 and 35 of a support 36, these end pieces 34 and 35 having slots therein; slot 37 in end member 34 may be seen in FIG. 3. A spring 38 is secured to the plate 31 and to the support 36, as is seen in FIGS. 3 and 4, so as to urge the plate 31 to the right to thereby urge the teeth 33 into engagement with the gear 26. A forwardly extending ear 39 on the plate 31 extends into the operating button 17.

In operation, the operating button 17 is pushed inwardly and is then released; on its inward motion, the teeth 33 will have some engagement with the gear 26, but upon release of the operating button 17, the spring 38 will cause the plate 31 to move from its inner position, shown in dotted lines at the right hand side of FIG. 4, towards its outer position, and due to the position and action of the spring the teeth 33 will engage with the gear 26 to thereby cause rotation of gear 26 and consequently cause rotation of disc 21.

The cylinder 23, being a third carrier element, is supported in the container 11 between the discs 21 and 22 by the horizontally extending spindle 41, cylinder 23 lying beneath the opening 14. The cylinder 23 has letters on the rim thereof, and may be caused to spin by a spinning mechanism 30.

Figure 5:
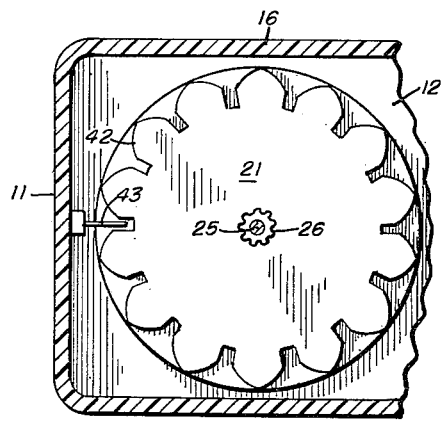
FIG. 5 is a cross sectional view taken on the line 5—5 of FIG. 3.
Figure 6:
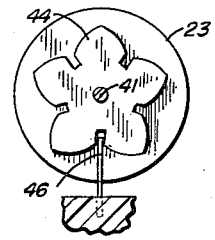
FIG. 6 is a cross sectional view taken on the line 6—6 of FIG. 3.

In order to randomly stop each of the carrier elements individually, and to prevent undue length of time of the turning of these elements, there may be provided the constructions shown in FIGS. 5 and 6 in particular. Referring first to FIG. 5, the under side of disc 21 may be seen to be provided with a plurality of notches 42, each of these notches corresponding to one of the letters on the upper surface of the disc 21. A spring detent 43 is secured to the container 11, and extends into the locus of the notches 42, the action being that when the disc 21 is spun, the spring detent 43 will be moved aside, but will resist spinning of disc 21, and will quickly slow down and stop the disc 21, at a random one of the notches 42. This will thereby orient one of the letters on the upper surface of disc 21 beneath the opening 13. A similar stopping arrangement is provided for disc 22.

For cylinder 23, there is provided the notches 44, in the locus of which there is a spring detent 46 secured to the container 11, and performing the same office as the detent 43.

It will also be appreciated that the carrier elements may be moved deliberately rather than randomly. Thus, the elements 21 and 22 may be rotated step by step, as desired by engaging a part thereof through the opening 20a.

The letters which appear on each of the carrier elements of the device 10 provide for the appearance of three letter monosyllabic words of the English language having initial and final consonants and a middle vowel. The following are groups of letters which appear on each of the carrier elements:

| First Carrier Element | Second Carrier Element | Third Carrier Element |
| --- | --- | --- |
| Group I | Group II | Group III |
| b, c, d, f, g, h, j, l, m, n, p, r, s, t | a, e, i, o, u | b, d, g, m, n, p, t |
| Group IV | | Group V |
| b, c, d, f, g, h, j, k, l, m, n, p, r, s, t, v, w, y, z | | b, d, g, h, l, m, n, p, r, s, t, w, x, y |

By providing the carrier elements with Groups I, II, and III, respectively, there is obtained an educative device 10 which will have a high probability of spelling an actual English word, the probability being approximately 1 out of 2, and in addition, each of the words spelled will have the short vowel sound. For example, the words spelled with Groups I, II, and III will be such words as bag, bet, dig, fog, and run. In addition to the fact that these short vowel sound words will be spelled, it will be appreciated that the educative device 10 with Groups I, II, and III will provide for gradual vocabulary building by enabling the student to vary one phoneme at a time; for example, the initial consonant phoneme may be varied so that the student can obtain a series of rhyming words such as bat, cat, fat, hat, mat, rat, pat, sat and tat. Similarly the final consonant phoneme may be varied so as to obtain a series such bed, beg, bet. Also, the vowel may be varied, by pushing the proper one of the operating buttons, operating button 18, so as to obtain a series such at bat, bet, bit and but. With such an educative device, the student will rapidly learn the word changes by variation of one phoneme at a time, and will be encouraged to proceed because the vowel sound will not be changed when varying either the first or last phoneme, i.e., by pushing operating button 17 or operating button 19, and also will be encouraged because of the high probability of obtaining an actual English word. For more elemental instruction, a carrier element may be rotated manually in a step by step manner to obtain the phonemes as desired.

For advanced work, Groups IV, II, and V may be used as the letters on the three carrier elements, respectively, so that there will thereby be obtained practically all the three letter monosyllabic words of the English language with initial and final consonants and an intermediate vowel, it being recognized that with these groups the short sound of the vowel will no longer be obtained almost exclusively since words such as wad and car may occur, and also there is somewhat less probability of the student obtaining an actual English word, than with the utilization of Groups I, II, and III. However, for more advanced students these variations in vowel sound and probability will be more rather than less, educative and are therefore highly desirable for such students.

There has been provided an educative device which will enable both beginning and more advanced students, either children or non-English speaking people, to rapidly learn basic English three letter monosyllabic words. Any one of the phonemes may be varied at will, and due to the random stopping of the carrier elements, an element of chance is thereby provided, thus enchancing the entertainment value of this educative device. For more advanced students, a wider range of three letter words is provided, so as to enhance that advanced student's range of words.

It will be obvious to those skilled in the art that various changes may be made without departing from the spirit of the invention and therefore the invention is not limited to what is shown in the drawings and described in the specification but only as indicated in the appended claims.

What is claimed is:

1. An educational device comprising a container having mounted therein, two discs rotatable in the same plane; a cylinder mounted in the container, between said discs, and rotatable in a plane perpendicular to the plane of the aforementioned discs, each of said discs and cylinders having characters printed thereon and only one character on each disc or cylinder being visible through the upper portion of said container at the point closest the nearest disc or cylinder; and a plurality of slide means adapted to randomly rotate each of said discs and said cylinder without affecting the other two, said slides being normally biased outwardly from said container but adapted to be depressed inwardly thereof by an operator, and all of said slides extending through the same face of the container, and each one thereof positioned nearest the cylinder or disc to be actuated thereby.

2. The educational device of claim 1, in which each slide has rack teeth on its intermediate portions and a smooth portion adjacent said rack teeth on the end furthest from the operator, this smooth portion being in normal engagement with a spur type gear mounted on each disc and cylinder and the rack portion being in engagement with the spur gear when the slide is depressed.

3. An educative device comprising a container having an upper generally flat face, first, second and third openings in said face, said first and third openings having a pair of arcuate lobes, each extending less than 90° and each pair of said lobes being asymmetrically spaced around the openings so as to provide a relatively small space nearest the adjacent second opening, first and second horizontal discs in said container each having letters on the upper surfaces and adjacent the peripheries thereof, means rotatably supporting each said disc at the center thereof generally parallel to and slightly below said face and with a part of the pheriphery of each said disc below the first and third openings, respectively, a cylinder in said container, said cylinder having its axial length relatively short with respect to its radius, and rotatably mounted at its axis in the container between said discs and having letters on the rim thereof, means rotatably supporting said cylinder with the rim thereof below said second opening, individual means for spinning each said disc and cylinder, individual means for randomly stopping each said disc and cylinder with a letter beneath a corresponding one of said openings.

4. The educative device of claim 3, in which the letters on said discs are consonants and the letters on said cylinder are vowels.

5. The educational device of claim 4, in which the letter are so grouped on the discs and cylinder that the probability of the three letters, appearing in said relatively small spaces and said second opening, forming an English word is at least 50%.

6. The educational device of claim 3, in which the letters on the disc on the left side of the operator are b, c, d, f, g, h, j, l, m, n, p, r, s, t; the vowels on the cylinder are a, e, i, o, u; and the group of letters on the disc on the right side are b, d, g, m, n, p, t.

7. The educational device of claim 3 in which separate actuators are provided for each of said individual spinning means so as to permit each disc and cylinder to be randomly rotated by a separate actuator.

8. The educational device of claim 7, in which all of said actuators are located on the same face of the device.

References Cited in the file of this patent

UNITED STATES PATENTS

| 93,350 | Rossiter | Aug. 3, 1869 |
| 366,821 | Dougherty | July 19, 1887 |
| 396,067 | Bodey | Jan. 15, 1889 |
| 518,316 | Grove | Apr. 17, 1894 |
| 667,397 | Jones | Feb. 5, 1901 |
| 2,152,777 | Swindell | Apr. 4, 1939 |
| 2,731,267 | Brenner | Jan. 17, 1956 |
| 2,771,694 | Laughton | Nov. 27, 1956 |

FOREIGN PATENTS

| 749,001 | Great Britain | May 16, 1956 |
| 820,313 | Great Britain | Sept. 16, 1959 |